United States Patent [19]

Guterman

[11] Patent Number: 5,141,018
[45] Date of Patent: Aug. 25, 1992

[54] QUARTER TURN BALL VALVE

[75] Inventor: Frederick J. Guterman, Glenmont, N.Y.

[73] Assignee: American Valve, Inc., Chicago, Ill.

[21] Appl. No.: 608,803

[22] Filed: Nov. 5, 1990

[51] Int. Cl.⁵ .......................... F16K 5/06; F16K 27/06
[52] U.S. Cl. ...................................... 137/375; 251/315
[58] Field of Search ................ 137/375; 251/315, 316, 251/317, 285, 288

[56] References Cited

U.S. PATENT DOCUMENTS

| | | | |
|---|---|---|---|
| 3,073,336 | 1/1963 | Johnson | 137/375 |
| 3,334,650 | 8/1967 | Lowrey et al. | 137/375 |
| 3,537,473 | 11/1970 | DeZurik, Jr. | 251/288 |
| 3,662,778 | 5/1972 | Leopold, Jr. et al. | 137/375 |
| 3,857,546 | 12/1974 | Quirk | 137/375 |
| 4,219,046 | 8/1980 | West et al. | 137/375 |
| 4,532,957 | 8/1985 | Battle et al. | 137/375 |
| 4,696,323 | 9/1987 | Iff | 137/375 |

*Primary Examiner*—George L. Walton

[57] ABSTRACT

A quarter turn cast iron ball valve where the ball inside is cast of metal, solid or hollow, and forms a cylinder or tube across the inside. This tube is "open" on both ends so that when the ball is seated and turned to its open position there is a diametrically extended flow passage allowing the fluid to flow through the valve. The ball is covered with "Teflon" on the periphery of the ball as well as on the inside periphery of the tube. The gland plate has a locking mechanism which enables the valve to be quickly set to a desired position on a permanent basis and be locked in either the full, opened or closed position.

6 Claims, 1 Drawing Sheet

QUARTER TURN BALL VALVE

FIELD OF THE INVENTION

This invention relates to a quarter turn ball valve and, more particularly, to ball valves with flanged ends to be used for general service in Class 125 and 250 cast iron flanged gate valves having the standard face-to-face dimensions (ANSI B16.10) and for ball valves having the dimensions and drilling of end flanges conforming to the American cast iron flange standard, Class 125 and Class 250 (ANSI B16.1).

Ball valves have received wide acceptance in many types of liquid flow control applications. Their wide use is due in no small part to the ease and quickness of opening and closing. The introduction of the iron flanged ball valve to replace gate valves or plug valves in both high pressure and normal operations meeting the face-to-face dimensions (ANSI B16.10) for Class 125 and 250 cast iron flanged gate valves is relatively new in itself.

One of the most expensive components of the quarter turn ball valve is the valve ball itself, which is usually fabricated of stainless steel and/or with another metal coated with stainless steel. While there have been fabricated balls for valves previous to this time, as shown in the patent to Heller et al., U.S. Pat. No. 3,737,145, and balls made totally of co-polymer materials such as "Celcon" as shown in the patent to Wrasman, U.S. Pat. No. 3,961,770, and there has not been a ball fabricated of sold cast iron and coated with "Teflon" instead of the usual stainless steel for Class 125 and 250 cast iron flanged valves.

As can be seen from Clifford Anderson, U.S. Pat. No. 3,108,779, one of the commercially available fluorocarbon resins is polytetrafluoroethylene which has a low coefficient of friction, is inert to all known chemicals except molten alkaline metals, fluorine at elevated temperatures and certain complex halogen components and can be used for continuous service at temperatures as high as 500° F. degrees. Polytetrafluoroethylene is commercially sold in the United States by E.I. duPont Nemours and Company under its registered trademark "Teflon." Another polytetrafluoroethylene is commercially sold by Polymer Corp. under the registered trade name "PolyPenco."

Still another fluorocarbon resin having many desirable characteristics that can be used is polytrifluorochloroethylene which is commercially available in the United States from M. W. Kellogg under its registered trademark "Kel-F." However, other plastics which are corrosive resistant and fluid impervious and have properties known as "plastic memory" may also be used as well as other fluorocarbon polymers; for example, co-polymers such as tetrafluoroethylene, ethylene or chlorotrifluoroethylene could be used as a coating. Such items other than fluorocarbon polymers are: polythylene, polypropylene and vinyl polymers such as polyvinylchloride. Lennite UHMW polymer is such a material that can be used in this instance and is commercially sold as "Lennite" and is a registered trademark of West Lake Plastics Company for products made from UHMW polymer resins.

In this invention, a layer of "Teflon" is applied to the valve ball to achieve a valve that is inexpensive to manufacture as well as easy to operate.

The thickness of the "Teflon" to be used will depend upon such factors as the rated pressure of the valve, unit load, etc.

While "Teflon" has been used for packing, seats, gaskets and in many situations as a coating for the body of valves and sealing members so noted in the Patent to Clifford E. Anderson, U.S. Pat. No. 3,108,779, and J. M. Yost, U.S. Pat. No. 3,227,174, it has not been noted as a coating for a ball member made out of cast iron to be used inside a valve made of cast iron conforming to the face-to-face dimensions of ANSI B16.10 and Class 125 and 250 cast iron flanged gate valves.

The Patent to J.M. Yost, U.S. Pat. No. 3,227,174, emphasizes the need to produce a valve that can control highly corrosive fluids, particularly under high pressure and high temperatures. His design is specific in providing a valve in which the body and flow passages are completely covered in corrosion resistant material and is unique in the way the ball is placed in the sleeve and formed to control pressure and expansion of gases.

Clifford Anders, U.S. Pat. No. 3,108,779, also talks about coating all the load carrying structures with a corrosion resistant material. Yost has a ball made out of corrosive resistant material formed around an insert flattened on top and bottom that is then inserted in the sleeve, further heated, and allows the liner to shrink down the ball, becoming one complete component.

Our ball is round, made of cast iron, coated and is a separate component, not made part of the sleeve or engaging the inside wall of said enlarged sleeve. Nor is our valve coated on all load carrying members as per Clifford Anderson, U.S. Pat. No. 3,108,779, and J. M. Yost, U.S. Pat. No. 3,227,174.

Although the ball valve has increased in popularity, a gland plate has not been developed allowing the valve to be used in a throttling situation. While ball valves have the means to limit the turn to 90 or a quarter turn through the use of bolts or extensions on the castings, and in some instances allow the locking of the valve in a full, open or shut position, the mechanism is lacking to allow locking of the valve in a partial open position or setting the valve opening at a predetermined position.

It is therefore an object of this invention to provide a new and improved quarter turn valve which can be easily operated as well as manufactured inexpensively.

It is further an object of this invention to manufacture a quarter turn ball valve which can be used in general liquid and gas service that operates easily and which does not cost as much when a valve ball is either fabricated of stainless steel or housed with a stainless steel ball.

It is further an object of this invention to provide a quarter turn valve that has a metal valve ball which has been coated with a fluorocarbon material such, as "Teflon," after it has been molded.

It is further an object of this invention to provide a valve ball which is either electrostatically coated or bonded using compression molding with a fluorocarbon material to enhance sealing and provide chemical resistant characteristics as well as reduce friction and the cost of manufacturing the ball.

It is further an object of this invention to manufacture a quarter turn ball valve which can be used to balance a line through a memory stop incorporated in the gland plate that will allow the user to set a predetermined open or close position for the valve other than the full open and closed position and also allow the locking of the valve in the open and shut position.

Other and further objects of the invention will be obvious upon understanding the embodiment to be described and indicated in the appended claims and various advantages not referred to herein will occur to one skilled in the art upon employment of the invention in practice.

DESCRIPTION OF THE DRAWINGS

Referring to the drawing wherein like characters of reference are used to indicate corresponding parts and forming a part of the specification wherein.

DESCRIPTION OF THE PREFERRED EMBODIMENT

Figure 1:
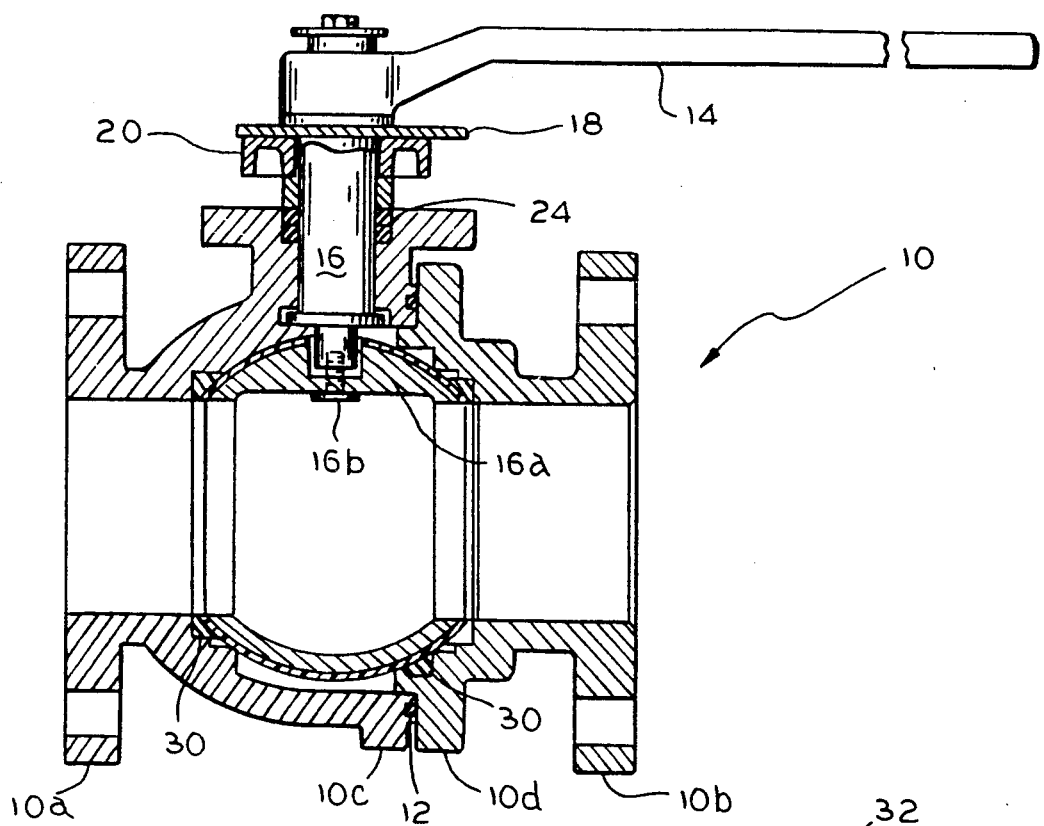
FIG. 1 is a half-sectional view of a quarter turn valve embodying the invention.

Referring to the drawings, a quarter turn valve is pictured that has a conventionally shaped body 10 with flanges 10a, 10b formed on each of the ends thereof. The body is bolted together by the bolting means 12 disposed around flanges 10c and 10d that have aligned and corresponding holes (not shown) to hold the valve together.

As is seen from FIG. 1 of the drawing, a handle 14 is associated with the stem 16 in a fixed relationship so that rotation of the handle 14 causes the stem 16 to rotate. The stem 16 can be keyed into the handle 14 to form the fixed relationship. A stop plate 18 is interposed between a gland 20 and the handle 14. The stem 16 is shown with the packing 24 to provide a seal with the body 10.

Also, the stem 16 extends through the gland 26 and has a key and pin that is attached to the valve ball in order that rotation of the handle 14 causes corresponding rotation of the valve ball 28.

Figure 2:
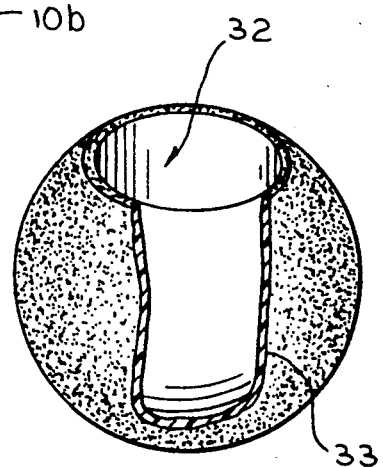
FIG. 2 is a spherical ball shown with a thin coating of "Teflon;" the ball has been cast of solid iron and then coated.

The valve ball is shown seated with a valve seal 30 which is also made of "Teflon" As seen from FIG. 2, the valve ball of this invention is of cast iron and there is a Teflon-coated tube 32 on the inside diameter that corresponds with the openings in the body of the ball valve when the tube and ball are in the open position. Also, the cast iron valve ball is coated with a thin coating of "Teflon." "Teflon" is a fluorocarbon material, commercially sold by E.I. duPont Nemours and Company under the registered trademark "Teflon". The particular polyfluoride is polytetrafluoroethylene. Another polytetrafluoroethylene is commercially sold by Polymer Corp. under the registered trade name "PolyPenco". Another fluorocarbon resin having many desirable characteristics that can be used is polytrifluorochloroethylene which is commercially available in the United States from M.W. Kellogg under its registered trademark "Kel-F". However, as stated before, other plastics which are corrosive resistant and fluid impervious and which have properties known as "plastic memory" may also be used. Such items other than fluorocarbon polymers are: polythylene, polypropylene and vinyl polymers such as polyvinylchloride and Lennite UHMW polymer is such a material that can be used in this instance. This is commercially sold as Lennite and is a registered trademark of West Lake Plastics Company for products made from UHMW polymer resins.

Figure 3:
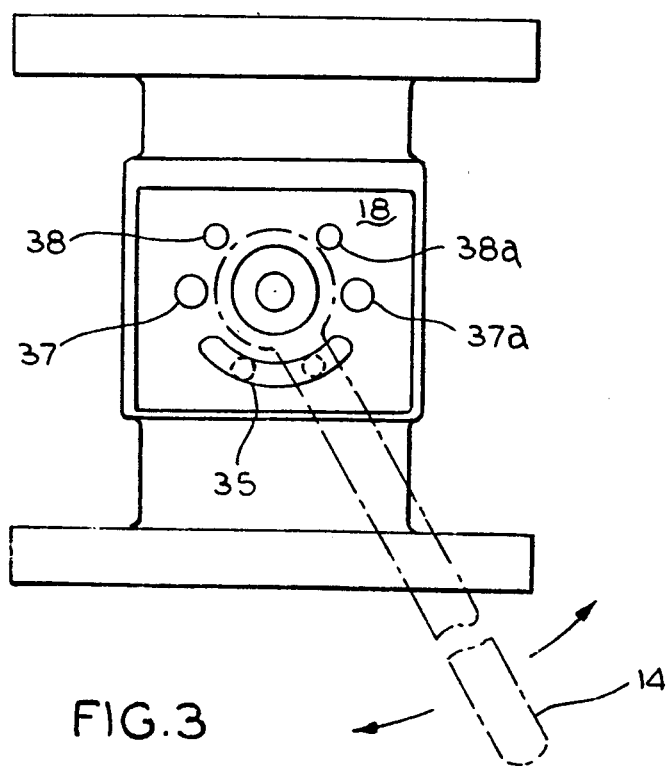
FIG. 3 is a top view of the valve shown in FIG. 1 with the gland plate.

As seen from the drawing in FIG. 3, the stop plate 18 has the arcuate segment portion 35 and the drilled holes 37, 37a and 38, 38a. The arcuate segment portion 35 is positioned so that a stop bolt (shown in phantom) can be located therein to provide for positioning of the handle 14 in a certain location easily. The handle 14 is provided with a corresponding hole (shown in phantom) so that a bolt can fit through the arcuate segment and stop plate and thereby locate the handle 14 where desired. The holes 37, 37a of the sides are for locking in either an "open" or "closed" position with a padlock or the like. The drilled holes 38, 38a can be used with well known, automatic actuators (not shown) that can be associated with the valve so that the valve can be actuated to an open or closed position remotely, without need of manually applying force to the handle 14 to urge it to rotate.

In addition to the foregoing improvements, the handle is of a length that can be cut and can fit in different spaces. Thus, a new and improved ball valve is provided wherein the valve ball, in being of cast iron and coated with "Teflon", is less expensive and just as efficient as stainless steel, having the face-to-face dimensions and drilling of end flanges conforming to the American cast iron flange standard, Class 125 and 250 (ANSI B16.1). Also, the valve, in having the stop plate 18, can be easily set to either its extreme position or the positions attainable by means of the arcuate segment as previously described.

Although one form of this invention has been illustrated and described and is not to be limited thereto except as far as such limitations are included in the following claims.

What is claimed is:

1. In a cast iron ball valve device of the type having a Class 125 and 250 rating;
    said ball valve device includes a valve housing, valve seat means, and a ball valve member with a diametrically extended flow passage therethrough;
    said ball being operatively disposed with said valve housing and movable between an open and closed position relative to said valve seat means;
    the improvement being that said ball is made of cast iron and has a coating of corrosion-resistant plastic material thereon;
    said ball is also adaptable to secure a valve stem thereto;
    whereby said ball valve can be operative in the steam rating specified while maintaining the dimensional sealing stability of said coating with said valve seat means.

2. A valve as defined in claim 1 wherein said ball is coated with a corrosion-resistant material made of a synthetic organic plastic having a low coefficient of friction.

3. A valve as defined in claim 1 wherein said ball is coated with a corrosion-resistant material identified as fluorocarbon polymer.

4. A valve as defined in claim 1 wherein said ball is coated with a corrosion-resistant material identified as polytetrafluoroethylene.

5. A valve as defined in claim 1 wherein said ball is coated with a corrosion-resistant material identified as polyethylene.

6. A valve as defined in claim 1 wherein said ball is coated with a corrosion-resistant material identified as a co-polymer.

* * * * *